United States Patent
Buckingham et al.

(10) Patent No.: US 8,331,052 B2
(45) Date of Patent: Dec. 11, 2012

(54) WRITING DATA TO A TAPE

(75) Inventors: Jonathan Peter Buckingham, Bristol (GB); Neil Thomas Hutchon, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 12/913,007

(22) Filed: Oct. 27, 2010

(65) Prior Publication Data

US 2012/0105995 A1    May 3, 2012

(51) Int. Cl.
*G11B 5/09* (2006.01)
*G11B 27/36* (2006.01)

(52) U.S. Cl. ............... 360/53; 360/31; 360/48

(58) Field of Classification Search ............... None
See application file for complete search history.

(56) References Cited

U.S. PATENT DOCUMENTS 7,127,554 B2 * 10/2006 Buckingham ............ 711/111
7,814,395 B2 * 10/2010 Monen et al. ............ 714/763

* cited by examiner

*Primary Examiner* — Regina N Holder
(74) *Attorney, Agent, or Firm* — Steven L. Webb

(57) ABSTRACT

A method and apparatus for writing data to a tape is disclosed. A plurality of data tracks are written onto a tape simultaneously. Any data tracks written to the tape that needs to be rewritten are identified. Each re-write unit that contains a data track that needs to be re-written is accumulated. The accumulated rewrite units are written to tape when a full set of rewrite units have been accumulated.

17 Claims, 2 Drawing Sheets

WRITING DATA TO A TAPE

BACKGROUND

Tape drives typically store multiple tracks of data onto a tape simultaneously. For example, tape drive that use the linear tape open (LTO) specification may write 16 tracks of data onto the tape at the same time. Many tape drive are configured with read heads positioned adjacent to or behind the write heads. This allows the tape drive to read the data from the tape as it is being written onto the tape. This feature is typically called read-while-write. Using the read-while-write feature a tape drive can immediately detect errors written onto the tape.

When an error is detected using the read-while-write feature, the data can be re-written to a different location on the tape. Currently all 16 tracks of data are re-written onto the tape even when only one track of the original 16 tracks had errors.

DETAILED DESCRIPTION

Figure 1:
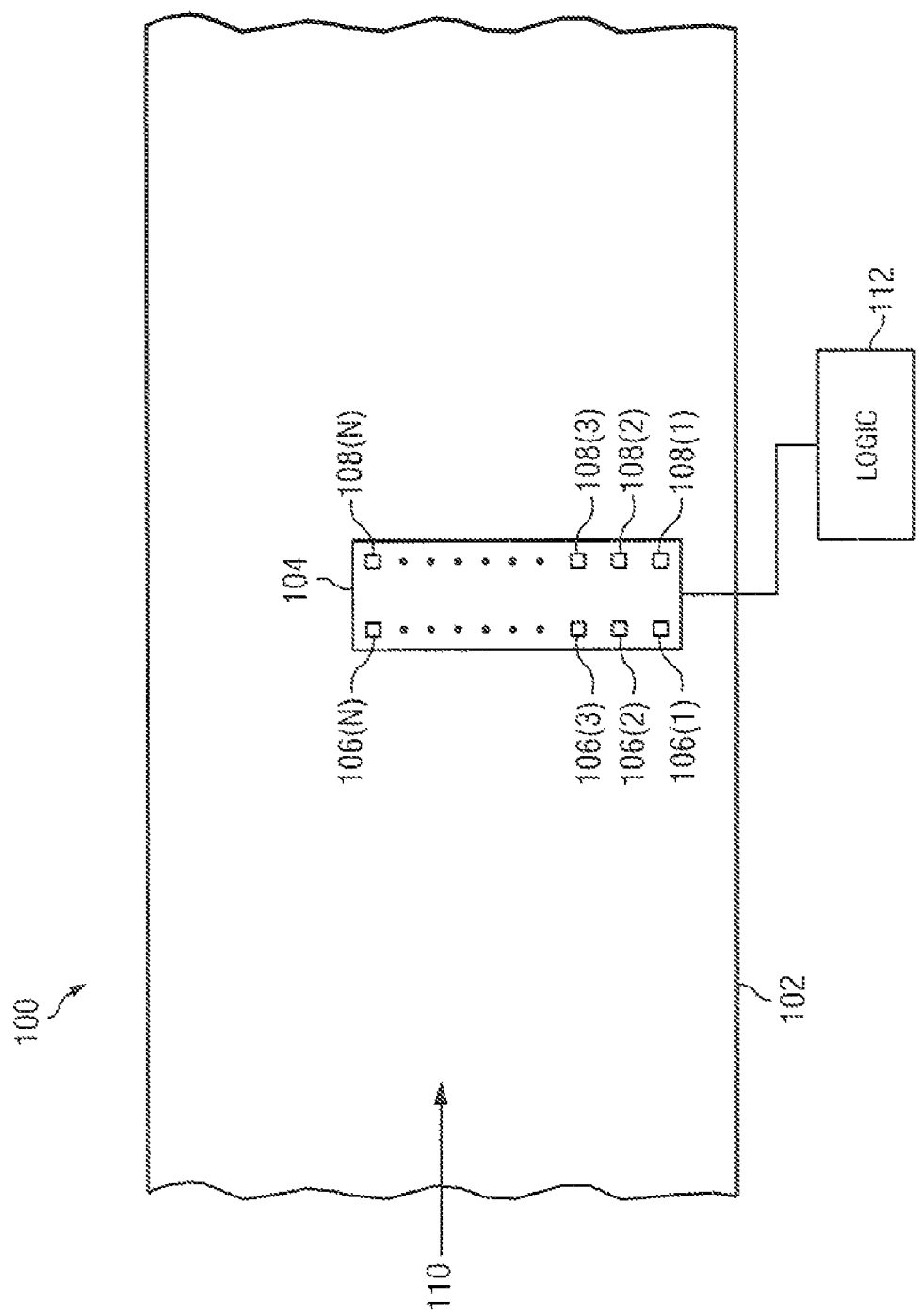
FIG. 1 shows a block diagram of a tape drive 100 in an example embodiment of the invention.
Figure 2:
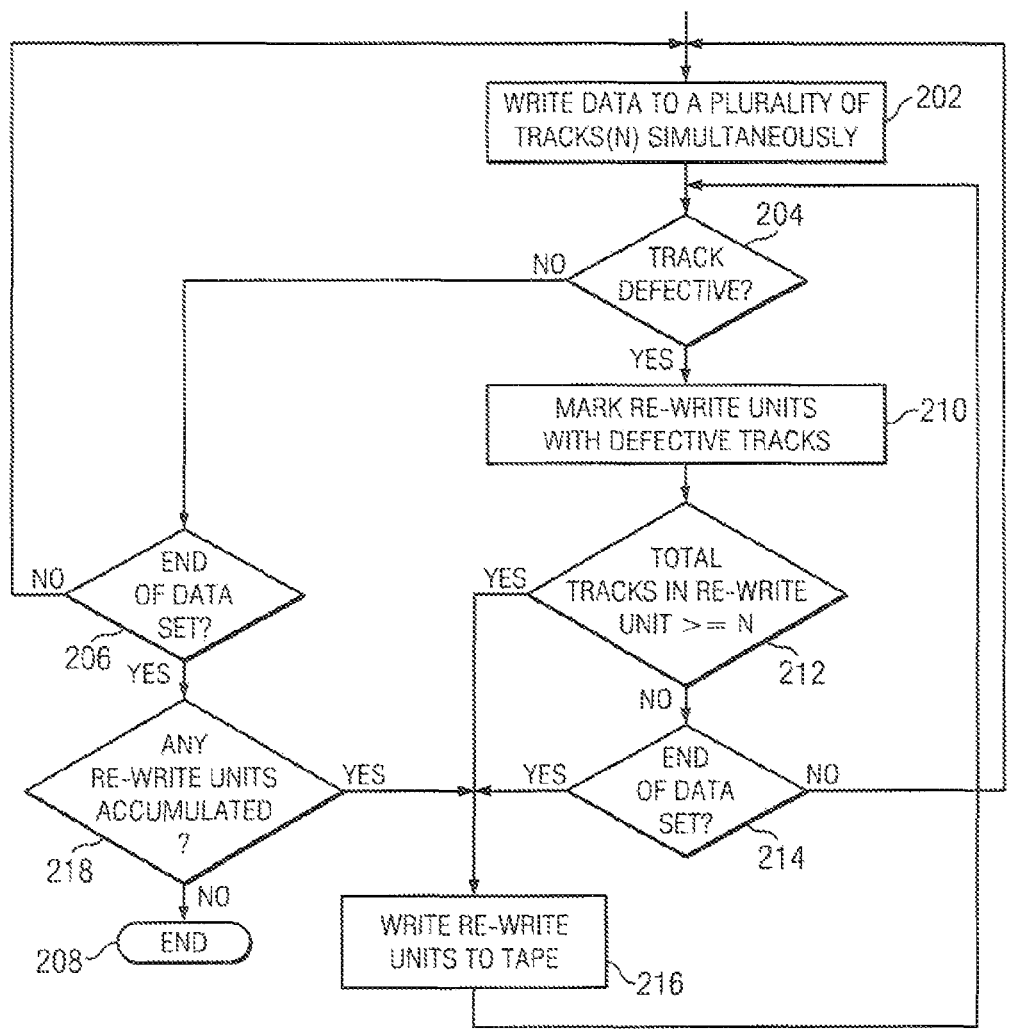
FIG. 2 is a flow chart for writing data to a tape in an example embodiment of the invention.

FIGS. 1-2, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In one example embodiment of the invention, a tape drive will divide the total number of data tracks written simultaneously onto the tape into re-write units that contain a subset of the total number of tracks written. When an error is detected using read-while-write, the re-write units that contain errors will be identified. The data contained in the identified re-write units will be accumulated until enough re-write units are available to write a full set of data tracks to the tape. For example, when a tape drive writes 16 tracks of data to the tape at the same time, the re-write unit may contain 4 tracks. The data contained in re-write units that had errors will not be re-written to the tape until 4 re-write units have been accumulated. A full set of re-write units is defined as the number of re-write units required to write a full set of data tracks to the tape simultaneously.

FIG. 1 shows a block diagram of a tape drive 100 in an example embodiment of the invention. Tape drive 100 comprises a tape 102; a tape read/write head 104 and logic 112. Tape 102 moves in the direction of arrow 110. Read/write head 104 comprises a plurality of write heads 106(1)-106(n) and a plurality of read heads 108(1)-108(N). The plurality of read heads 108(1)-108(N) are positioned adjacent the plurality of write heads 106(1)-106(n) to enable read-while-write functionality. Read/write head 104 can be positioned in multiple locations across the width of tape 102. In some example embodiment of the invention, the functionality of the read heads 108(1)-108(N) and write heads 106(1)-106(n) may be swapped when the tape 102 switches directions. Logic 112 is coupled to tape read/write head and is configured to monitor and control the data being written by read/write head 104. Logic 112 may comprise a processor, memory, an application specific integrated circuit (ASIC), a combination of processors, memory and ASICs, or the like.

In operation, tape drive 100 writes N number of data tracks onto tape 102 simultaneously, where N is a positive integer greater than one. Typically, N is an even number, for example 8 or 16. In some instances N may be an odd number, for example 9. Tape drive 100 writes data onto the tape in minimum sized chucks called datasets. Each dataset is subdivided into code word interleaved (CWI) sets. Each CWI set contains N tracks. There may be 10 CWI sets for each dataset. Therefore when writing a dataset onto the tape 102, tape drive will write 10 CWI sets onto tape, one CWI set after another. When a CWI set is being written onto the tape, tape drive uses read heads 108(1)-108(N) to confirm that the data was written correctly. When one or more tracks in the CWI set are defective, the defective data tracks will be re-written to the tape as discussed below.

Tape drive 100 subdivides the total number of data tracks N written onto tape 102 into re-write units. Each re-write unit contains a subset of the total number of tracks written by tape drive onto tape 102. For example, when a tape drive writes 16 data tracks onto the tape at the same time, each re-write unit may contain 1, 2, 4 or 8 tracks of data. The data tracks in a re-write unit may be adjacent to each other or may be interleaved with the data tracks of other re-write units.

When the data tracks in a re-write unit are adjacent and the tape drive writes 16 data tracks simultaneously and a re-write unit contains 4 data tracks, the first re-write unit will contain tracks 1-4, the second re-write unit will contain tracks 5-8, the third re-write unit will contain tracks 9-12, and the fourth re-write unit will contain tracks 13-16. In some example embodiments of the invention, track numbering may start at zero instead of 1. When the data tracks in a re-write unit are interleaved and the tape drive writes 16 data tracks simultaneously and a re-write unit contains 4 data tracks, the first re-write unit will contain tracks 1, 5, 9 and 13, the second re-write unit will contain tracks 2, 6, 10 and 14, and so on. In one example embodiment of the invention, each re-write unit will contain the same number of data tracks. In other example embodiments of the invention, the re-write units may contain a different number of tracks.

When tape drive 100 is writing a CWI set containing 16 data tracks onto the tape simultaneously, tape drive will use read heads 108(1)-108(N) to verify the data written onto the tape 102. When tape drive 100 determines that one or more data tracks are defective, tape drive identifies and accumulates the re-write unit(s) that contain the defective data tracks. Tape drive 100 will wait until one of two conditions occur before re-writing the accumulated re-write units onto the tape. The first condition is when enough re-write unites have been accumulated to make a full set of re-write units. For example, when the total number of data tracks written simultaneously is equal to 16, and each re-write unit contains 4 data tracks, then when 4 re-write units have been identified as having defective tracks, all four of the re-write unites will be written to tape simultaneously. By waiting until there are a total of 4 re-write units to be written back to the tape, the re-write efficiency may be increase by a factor of 4.

The second condition that will trigger the tape drive to write the accumulated re-write units to tape is when the end of the dataset is reached. Any re-write units that have been identified as containing defective data tracks, and that have not already been re-written to tape, will be written to the tape as the last CWI set in the dataset. Because the total number of tracks contained in the un-written re-write units is less than the total number of tracks in a CWI set, there will be unused tracks. The unused tracks, can be left blank, can be padded with data, or may be used to duplicate one or more of the current or former re-write units.

When a re-write unit is written to tape the track ordering inside the re-write unit is preserved. This allows cross channel interpolation between tracks in the re-write unit. Cross channel interpolation is an error correction technique that uses data from two or more tracks to re-create data lost to errors. The absolute track numbers used for a re-write unit may be changed. For example, a re-write unit may have originally been written to tracks 1-4, but when re-written back to tape the re-write unit may be written to tracks 5-8. When a re-write unit is re-written to tape, the header for each track in the re-write unit is modified to indicate that this is a re-written track of data. In some example embodiment of the invention, an RF flag is set to indicate a re-written re-write unit.

When a CWI set is read from tape and none of the headers indicate re-written data, all the tracks in the CWI set can be used for cross channel interpolation. In general, increasing the number of tracks that are available for cross channel interpolation increases the number or severity of errors that can be corrected. When a re-write unit contains only one track, there can be no cross channel interpolation inside the re-write unit. Other error correction techniques may be applied to each track in addition to, or as a replacement for, cross channel interpolation.

FIG. 2 is a flow chart for a method of writing data to a tape in an example embodiment of the invention. At step 202, a plurality of data tracks are written to the tape simultaneously. At step 204 a check is made to determine if any of the data tracks written in the previous step are defective. If there are no defective tracks, a check is made at step 206 to determine if the end of the dataset has been reached. If the end of the dataset has not been reached, flow returns to step 202. If the end of the dataset has been reached flow continues at step 218. At step 218 a check is made to determine if there are any accumulated re-write unites. If no re-write units are accumulated flow stops at step 208. If there are re-write units are accumulated, flow proceeds to step 216.

If it is determined that there are defective tracks at step 204 flow proceeds to step 210. At step 210 any re-write units with a defective track are identified so that they can be accumulated. At step 212 the total number of tracks in all the accumulated re-write units is compared against the plurality of tracks N (i.e. checking for a full set of re-write units). When the total number of tracks in the accumulated re-write units is equal to or greater than the plurality of track N, flow proceeds to step 216. At step 216 a full set of the accumulated re-write units are written to tape. A full set of re-write units contain the same number of tracks as the plurality of track N. For example, when the plurality of tracks N is equal to 8, and a re-write unit contains 4 tracks, there would be 2 re-write units in a full set of re-write units. All the re-write units written to tape are cleared from the accumulated re-write units. Any accumulated re-write units beyond the full set of re-write units are retained in the set of accumulated re-write units. Flow then returns to step 204.

At step 212 when the total number of tracks in the marked re-write units is not equal to or greater than the plurality of track N, flow proceeds to step 214. At step 214 a check is made to determine if the end of the dataset has been reached. When the end of the dataset has not been reached, flow returns to step 202. If the end of the dataset has been reached, flow proceeds to step 216. At step 216 all the accumulated re-write units are written to tape. The accumulated re-write units written to tape will not be a full set of re-write units. The unused tracks may be left blank, may be padded with data, or may be used to replicate one or more of the marked re-write units. Flow then returns to step 204.

What is claimed is:

1. A method for writing data to a tape, comprising:
   writing data from a dataset onto the tape by simultaneously writing a plurality of data tracks N onto the tape;
   dividing the plurality of data tracks N into a plurality of rewrite units wherein each of the plurality of rewrite units contains a subset of the plurality of data tracks N;
   determining if one or more of the plurality of data tracks N written to the tape needs to be rewritten;
   accumulating each of the plurality of rewrite units for a rewrite when any one data track in a rewrite unit needs to be rewritten;
   when a full set of rewrite units has been accumulated, simultaneously rewriting the full set of rewrite units to the tape and then deleting the rewritten rewrite units from the accumulated list;
   when the end of the dataset is reached, writing any remaining accumulated rewrite units to the tape.

2. The method for writing data to a tape of claim 1, wherein a full set of rewrite units contain the same number of data tracks as the plurality of data tracks N.

3. The method for writing data to a tape of claim 1, wherein there are 16 data tracks in the plurality of data tracks (N=16) and a number of data tracks in each of the plurality of rewrite unites is selected from the group comprising: 1 data track, 2 data tracks, 4 data tracks, and 8 data tracks.

4. The method for writing data to a tape of claim 1, wherein an absolute track location for an accumulated rewrite unit is changed when the rewrite unit is re-written to tape.

5. The method for writing data to a tape of claim 1, wherein the tracks in a rewrite unit are adjacent.

6. The method for writing data to a tape of claim 1, wherein the tracks in a rewrite unit are not adjacent.

7. The method for writing data to a tape of claim 1, wherein a header in each data track in the rewrite unit re-written to tape is modified to indicate that this is a re-written rewrite unit.

8. The method for writing data to a tape of claim 1, wherein the data tracks in a rewrite unit are used for cross channel interpolation.

9. The method for writing data to a tape of claim 1, wherein read while write is used to determine if one or more of the plurality of data tracks N written to the tape needs to be rewritten.

10. The method for writing data to a tape of claim 1, wherein each of the rewrite units has the same number of data tracks.

11. A tape drive, comprising:
    at least one tape read/write head, wherein the at least one read/write head is configured to write a plurality of data tracks onto a tape simultaneously
    logic coupled to the read/write bead and configured to determine when one or more of the plurality of data tracks written to the tape needs to be rewritten;
    the logic configured to accumulate rewrite units when one or more data tracks in the rewrite unit needs to be rewritten, wherein the accumulated rewrite units are written to tape when a full set of rewrite units have been accumulated.

12. The tape drive of claim 11, wherein a full set of rewrite units contain the same number of data tracks as the plurality of data tracks.

13. The tape drive of claim 11, wherein each rewrite unit contains a subset of the plurality of data tracks and a number of data tracks in each of the plurality of rewrite units is selected from the group comprising: 1 data track, 2 data tracks, 4 data tracks, and 8 data tracks.

14. The tape drive of claim 11, wherein an absolute track location for an accumulated rewrite unit is changed when the rewrite unit is re-written to tape.

15. The tape drive of claim 11, wherein a header in each data track in the accumulated rewrite unit re-written to tape is modified to indicate that this is a re-written rewrite unit.

16. The tape drive of claim 11, wherein the data tracks in a rewrite unit are used for cross channel interpolation.

17. The tape drive of claim 11, wherein at least one of the rewrite units in the full set of rewrite units has a different number of data tracks than the other rewrite unites in the full set of rewrite units.

* * * * *

UNITED STATES PATENT AND TRADEMARK OFFICE
CERTIFICATE OF CORRECTION

PATENT NO. : 8,331,052 B2  
APPLICATION NO. : 12/913007  
DATED : December 11, 2012  
INVENTOR(S) : Jonathan Peter Buckingham et al.

It is certified that error appears in the above-identified patent and that said Letters Patent is hereby corrected as shown below:

In column 4, line 28, in Claim 3, delete "unites" and insert -- units --, therefor.

In column 4, line 53, in Claim 11, delete "simultaneously" and insert -- simultaneously; --, therefor.

In column 4, line 54, in Claim 11, delete "bead" and insert -- head --, therefor.

In column 6, line 5, in Claim 17, delete "unites" and insert -- units --, therefor.

Signed and Sealed this
Twelfth Day of March, 2013

Teresa Stanek Rea
*Acting Director of the United States Patent and Trademark Office*